United States Patent [19]

Lindenmaier et al.

[11] Patent Number: 4,553,520
[45] Date of Patent: Nov. 19, 1985

[54] DEVICE FOR THE GENERATION OF A DEFINED FUEL VAPOR/AIR MIXTURE

[75] Inventors: Klaus Lindenmaier, Stuttgart; Josef Zieger, Esslingen, both of Fed. Rep. of Germany

[73] Assignee: Daimler-Benz Aktiengesellschaft, Fed. Rep. of Germany

[21] Appl. No.: 650,006

[22] Filed: Sep. 13, 1984

[30] Foreign Application Priority Data

Sep. 13, 1983 [DE] Fed. Rep. of Germany ....... 3332933

[51] Int. Cl.[4] .............................................. F02M 31/00
[52] U.S. Cl. ...................................... 123/557; 123/523
[58] Field of Search ............... 123/557, 522, 523, 524; 261/144, 145, 142; 48/180 C, 180 H

[56] References Cited

U.S. PATENT DOCUMENTS 4,388,911  6/1983  Lindemaier .......................... 123/523

Primary Examiner—Ronald H. Lazarus
Attorney, Agent, or Firm—Craig and Burns

[57] ABSTRACT

A device for the production of a fuel vapor/air mixture for spark-ignition engines comprising a float chamber and a vaporizer chamber with heated vaporizer surface, an intake pipe being provided with a first fixed diaphragm or nozzle, the liquid spaces of the vaporizer chamber and of the float chamber being connected to each other by means of a line, the gas space of the float chamber being connected upstream of the diaphragm or nozzle, viewed in the direction of flow, and the gas space of the vaporizer chamber being connected downstream of the diaphragm or of the nozzle, viewed in the direction of flow, to the intake pipe, by means of lines in each case, and the line from the gas space of the vaporizer chamber into the intake pipe being provided with a second fixed diaphragm or nozzle, which induces a pressure drop of 85 to 99.99% of the first diaphragm or nozzle, and a damping line being arranged between float chamber and vaporizer chamber at the height of the liquid level when the engine is at rest, through which line liquid can pass from the vaporizer chamber into the float chamber, or vice versa, when pressure peaks occur, without the entire liquid columns in the vaporizer chamber and float chamber having to be set in motion. This prevents fluid pulsations which may otherwise occur and make it possible for the engine to run smoothly.

3 Claims, 1 Drawing Figure

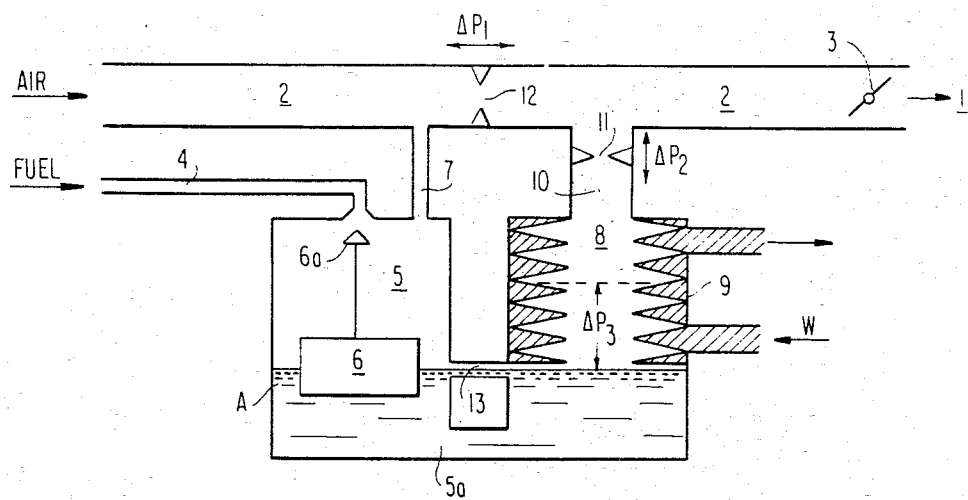

DEVICE FOR THE GENERATION OF A DEFINED FUEL VAPOR/AIR MIXTURE

It is known that the even distribution of fuel to the individual cylinders and the exhaust characteristics of a spark-ignition engine can be improved if the engine is offered a single-phase fuel vapor/air mixture instead of the conventional fuel droplet/air mixture. Numerous devices have, therefore, already been described, by means of which the liquid fuel can be transferred in the form of vapor. A particularly simple self-regulating vaporizing device is described in German Offenlegungsschrift No. 2,950,126. In the case of this device, which has a float chamber and a vaporizer chamber with heated vaporizer surface, the liquid space of the float-chamber and the liquid space of the vaporizer chamber are connected to each other by means of a line. Furthermore, a first fixed diaphragm or nozzle is arranged in the intake pipe, and the gas space of the float chamber is connected by a line upstream of this diaphragm or nozzle, viewed in the direction of flow, and the gas space of the vaporizer chamber is connected by a line downstream of this diaphragm or nozzle, viewed in the direction of flow, to an intake pipe. In the line from the gas space of the vaporizer chamber into the intake pipe, a further fixed diaphragm or nozzle is arranged, which induces a pressure drop of 85 to 99.99% of the first diaphragm or nozzle. The heated vaporizer surface is arranged in the vaporizer chamber above the liquid level adjusted by the float chamber, or by an overflow vessel having the same effect, in such a way that, with increasing liquid level, the wetted vaporizer surface area also increases. The device is of very simple design and has self-regulating properties.

It has, however, been demonstrated that, under certain operational conditions, regulating oscillations can occur, manifesting themselves in a pulsating back-and-forth flowing of fuel through the connecting line for fuel transportation between the liquid space of the float chamber and the liquid space of the vaporizer chamber. This back-and-forth flow manifests itself in the level for the fuel in the float chamber and vaporizer chamber fluctuating cyclically about a mean and in a cyclically fluctuating amount of vaporizing fuel. These cyclic fluctuations have an adverse effect on the smooth running of the engine and thus cause a reduction in comfort.

An object of the invention is to produce an improved device for vaporizing fuel.

A further object of the invention is to produce a device of the type described with which the fluid oscillations occurring are at least damped to such an extent that no adverse effects of the oscillations on the behavior of the engine are perceptible.

A feature of the invention consists in connecting the float chamber and the vaporizer chamber by means of a damping line at the height of the zero level, in other words at the height of the fuel level in the float and vaporizer chambers when the engine is at rest. Such a connection undoubtedly does not change the steady-state adjustment values of the fuel level in the two chambers as the same pressure prevails on both sides of the damping line. However, if oscillations occur, fuel can flow over from the vaporizer chamber into the float chamber in phases of excessive vaporizer chamber pressure, without the fuel columns in the vaporizer and float chambers being set in motion, in other words without inciting pulsations. In phases of inadequate vaporizer chamber pressure, some air or fuel can be sucked into the vaporizer chamber from the float chamber; pressure equalization is thus effected in this case as well by the damping line without any movement of the liquid fuel columns.

In order to ensure an effective performance of the damping line, the damping line, or rather its two openings to the float chamber and to the vaporizer chamber, should be in line with the zero level, that is, at the level assumed by the fuel when the motor is at rest.

The damping line can act to reduce pressure amplitudes in the vaporizer vessel, without the entire liquid in the vaporizer vessel and float vessel having to be set in motion. The reduction in pressure amplitudes is all the more successful the less the inert mass of fuel there is in the damping line. It must therefore be kept as small as possible, i.e., the line should be as short as possible. The cross-section of the damping line must be optimized to the particular type of carburetor. As a guide, it can be stated that the cross-sectional area of the damping line is proportionate to the cross-sectional area of the connecting line between the float chamber and the vaporizer chamber, but conversely is proportionate to the cross-sectional area of the diaphragm orifice between vaporizer chamber and intake pipe. Satisfactory results are generally achieved when the damping line has about the same cross-sectional area as the fuel vapor diaphragm between vaporizer chamber and suction pipe. At the same time, the damping line should preferably be between 0.5 and 3 mm long, which may have to be taken into consideration in the design of the vaporizing apparatus.

The foregoing and other objects, features, and advantages of the present invention will become more apparent from the following description when taken in connection with the accompanying drawing which shows, for the purposes of illustration only, one embodiment in accordance with the present invention.

An example of the invention will now be described with reference to the drawing. The air is fed to the engine 1 via the suction pipe 2 with the throttle valve 3 for power control. The liquid fuel is delivered by the fuel pump via a line 4 to the float chamber 5, another level-regulating vessel, where the float 6 with feed valve 6a maintaining a uniform flow level as in the case of a conventional carburetor. Fuel purge and return facilities are not shown. The gas space of the float chamber 5 is connected via a pressure equalization line 7 to the suction pipe 2, and the liquid space of the float chamber is connected by means of a lower fuel-filled connecting line 5a to the vaporizer chamber 8. Float chamber 5 and vaporizer chamber 8 therefore form communicating pipes, in which the fuel level A adjusts itself to the same height, which is determined by float 6 with feed valve 6a when the engine is at rest. Furthermore, the float chamber 5 is connected to the vaporizer chamber 8 by means of the damping line 13, which runs at the height of the fuel level A (zero level). Arranged in the vaporizer chamber 8 above the fuel level A is the heat exchanger surface 9, through which heat supply W at a temperature above the upper boiling temperature of the fuel is kept at 1 bar. The gas space of the vaporizer chamber 8 is connected to the suction pipe 2 via a vapor line 10. A diaphragm 11 is arranged in the vapor line 10. Between the inlets of the pressure equalization line 7 and the vapor line 10 in the suction pipe there is a diaphragm 12. With the engine running, the air taken in generates a pressure gradient $\Delta p_1$ at the diaphragm 12 in the suction pipe 2, which increases with increasing air flow rate. This pressure gradient $\Delta p_1$ has an effect on the fuel level in the float chamber 5 and in the vaporizer chamber 8, via lines 7 and 10, so that, due to the lower pressure, the fuel level in the vaporizer chamber adjusts itself to a higher level than that prevailing in the float chamber 5, determined by the float 6. This requires a pressure differential $\Delta p_3$. The heat exchanger surfaces 9 are therefore partially covered by liquid fuel, which vaporizes on them and flows as fuel vapor via the vapor line 10 with diaphragm 11 to the suction pipe 2, where it mixes with the air. The higher the fuel level in the vaporizer chamber 8 rises, the greater the covered vaporizer surface and the more fuel vaporized per unit of time. The fuel vapor flow can raise a pressure gradient $\Delta p_2$ at diaphragm 11, which increases analogously with the pressure gradient $\Delta p_1$ in relation to the fuel vapor flow rate. Diaphragm 11 is dimensioned in such a way that it induces a pressure drop of 85 to 99.99% of diaphragm 12. Since $\Delta p_2$ is practically equal to $\Delta p_1$ and the amount of fuel flowing through the diaphragm 11 is proportionate to the amount of air flowing in suction pipe 2, the required fixed air/fuel ratio value of the mixture is produced even if flow rates vary over a large range. At the same time, the interrelationship of $\Delta p_1$ and $\Delta p_2$ with the small $\Delta p_3$ provides that the fuel level in the vaporizer chamber 8, and thus the heat exchanger surface 9 covered by fuel, always adjusts itself so that just the required amount of fuel is vaporized per unit of time. This thus produces an automatic self-regulation of the amount of vaporizer fuel. In the event of sudden pressure fluctuations, fuel can flow over through the damping line 13 from the float chamber 5 into the vaporizer chamber 9, and vice versa, without the fuel columns in the vaporizer chamber 9 and float chamber 5 moving appreciably, in other words, without pulsations occurring. This results in the mixture composition being especially even, which leads to comfortable running of the engine.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. In a device for the generation of a defined fuel vapor/air mixture for spark-ignition engines having an intake pipe, a float chamber and a vaporizer chamber with heated vaporizer surface, said float chamber and said vaporizer chamber having a gas space and a liquid space, the intake pipe being provided with a first fixed diaphragm or nozzle, the liquid space of the float chamber and the liquid space of the vaporizer chamber being connected to one another by means of a line, the gas space of the float chamber being connected upstream of the first fixed diaphragm or nozzle, viewed in the direction of flow, and the gas space of the vaporizer chamber being connected downstream of the diaphragm, viewed in the direction of flow, to the intake pipe, a second fixed diaphragm or nozzle arranged in a second line from the gas space of the vaporizer chamber into the intake pipe, which diaphragm or nozzle induces a pressure drop of 85 to 99.99% of the first diaphragm, the vaporizer surface arranged above the vaporizer chamber liquid level for adjustment by means of the float chamber in such a way that, with increasing liquid level, wetted vaporizer surface increases, and wherein the improvement comprises a damping line disposed between vaporizer chamber and float chamber at the height of the fuel level with the engine at rest, through which line the liquid fuel can transfer from the vaporizer chamber into the float chamber, and vice versa.

2. A device according to claim 1, wherein the damping line is 0.5 to 3 mm long.

3. A device according to claim 1, wherein the cross-sectional area of the damping line corresponds in magnitude to the cross-sectional area of the second fixed diaphragm or nozzle located in the line between vaporizer chamber and intake pipe.

* * * * *